(12) United States Patent
Lanoiselle et al.

(10) Patent No.: US 9,247,760 B2
(45) Date of Patent: Feb. 2, 2016

(54) METHOD FOR EXTRACTING MOLECULES OF INTEREST FROM GRAPE POMACE

(75) Inventors: Jean-Louis Lanoiselle, Inguiniel (FR); Eugène Vorobiev, Compiegne (FR); Nadia Boussetta, Compiegne (FR); Sébastien Manteau, Boursault (FR); Michel Logeat, Varennes Vauzelles (FR)

(73) Assignees: UNIVERSITE TECHNOLOGIE DE COMPIEGNE—UTC, Compiegne (FR); SOCIETE FRANCAISE DE LABORATOIRES D'OENOLOGIE SOFRALAB, Magenta (FR)

( * ) Notice: Subject to any disclaimer, the term of this patent is extended or adjusted under 35 U.S.C. 154(b) by 0 days.

(21) Appl. No.: 13/824,734

(22) PCT Filed: Nov. 21, 2011

(86) PCT No.: PCT/EP2011/070597
§ 371 (c)(1),
(2), (4) Date: Aug. 14, 2013

(87) PCT Pub. No.: WO2012/066144
PCT Pub. Date: May 24, 2012

(65) Prior Publication Data
US 2013/0323372 A1    Dec. 5, 2013
US 2015/0327582 A2    Nov. 19, 2015

(30) Foreign Application Priority Data
Nov. 19, 2010  (FR) ..................................... 10 59547

(51) Int. Cl.
*A23L 1/221*  (2006.01)
*A23L 1/025*  (2006.01)
*A23N 1/00*   (2006.01)
*C02F 1/46*   (2006.01)
*A23L 1/30*   (2006.01)
*B01D 11/02*  (2006.01)

(52) U.S. Cl.
CPC ............... *A23L 1/2215* (2013.01); *A23L 1/025* (2013.01); *A23L 1/3002* (2013.01); *A23N 1/006* (2013.01); *B01D 11/0211* (2013.01); *C02F 1/4608* (2013.01)

(58) Field of Classification Search
CPC ..... A23L 1/2215; A23L 1/025; A23L 1/3002; A23N 1/006; C02F 1/4608; C02F 2103/325; B01D 11/0211
USPC .......................... 426/239, 655, 237, 238, 592
See application file for complete search history.

(56) References Cited

U.S. PATENT DOCUMENTS

| | | | |
|---|---|---|---|
| 8,147,879 B2 * | 4/2012 | Ngadi et al. .................. | 424/725 |
| 2007/0003644 A1 * | 1/2007 | Randhava et al. ............ | 424/766 |
| 2008/0279995 A1 * | 11/2008 | Schultheiss et al. .......... | 426/238 |
| 2012/0294993 A1 * | 11/2012 | Singleton et al. ............. | 426/237 |

FOREIGN PATENT DOCUMENTS

SU           1751188         *  7/1992
WO     WO 2008/034228 A1       3/2008

OTHER PUBLICATIONS

English Translation for Deslart et al. Jun. 2010. http://www.oiv2010.ge/POSTER/POST_OENOLOGY/P.II.46-No%20171%20P%20Delsart%20EFFECT%20OF%20PULSEDELECT.pdf.*
English Translation for Li et al. Recents Progres En Genie Des Procedes, vol. 98, 2009.*
Fish et al. Journal of Food Composition and Analysis. 2002. vol. 15. pp. 309-317.*
Cristele et al., "Effet des champs electriques pulses sur l'extraction des polyphenols du raisin," retrieved from the Internet, http://ww.oiv2010.ge/POSTER/POST_OENO LOGY/P.II.46-No%2017%20%20Delsart%20EFFECT%200%20PULSEDELECT.pdf, Jun. 20, 2010.
Li et al., "Extractoin aqueuse d'huile vegetale de tourteaux oleagineux," Recents Progres en Genie des Procedes, vol. 98, pp. 69-1-69-6, 2009.
Anonymous, "Scientifique Programme," 33rd World Congress of Vine and Wine, Tbilisi, Georgia, pp. 1-15, Jun. 20, 2010.
International Search Report issued in application No. PCT/EP2011/070597 on Mar. 15, 2012.
French Search Report issued in application No. FR 1059547 on Jun. 8, 2011.
EPO Official Communication dated Jul. 17, 2014, in counterpart EP Appln No. 11 784 702.0.
Corrales, et al., "Extraction of anthocyanins from grape by-products assisted by ultrasonics, high hydrostatic pressure of pulsed electric fields: A comparison," Innovative Food Science and Emerging Technologies, 2008, vol. 9, pp. 85-91.
Lopez, et al., "Effects of pulsed electric fields on the extraction of phenolic compounds during the fermentation of must of Tempranillo grapes," Innovative Food Science and Emerging Technologies, 2008, vol. 9, pp. 477-482.

* cited by examiner

*Primary Examiner* — Anthony Weier
(74) *Attorney, Agent, or Firm* — Foley & Lardner LLP

(57) ABSTRACT

The invention relates to a method for extracting molecules of interest from a plant matrix, the method including the following steps: electrically processing the plant matrix by means of pulsed power; diffusing the molecules of interest from the processed plant matrix in a hydroalcoholic solvent and/or a solvent including ethyl acetate; and recovering the molecules of interest that were diffused.

23 Claims, No Drawings

METHOD FOR EXTRACTING MOLECULES OF INTEREST FROM GRAPE POMACE

TECHNICAL FIELD

The invention relates to the field of the extraction of molecules of interest from a plant matrix or the like, and more particularly from a by-product of wine making such as grape pomace, lees or must deposits.

Grape pomace results from the pressing of grapes, and includes notably seeds, skins, and stems.

Lees are obtained after fermentation of grape juice with yeasts. It is the deposit formed after fermentation containing transformed yeasts or yeast fragments.

Must deposits are all of the particles that sediment after pressing.

The invention is thus applicable to the extraction of molecules of interest from seeds, skins and stems, taken individually or in combination, lees or must deposits.

The invention also relates to the field of the extraction of molecules of interest from tea (notably green tea), cocoa beans, berries (notably red berries), oilseeds such as flax, apples, etc.

PRIOR ART

In the following, we will describe in more detail the invention as it applies to the extraction of polyphenols from a plant matrix, notably grape pomace. This is, however, in no way restrictive, insofar as these molecules can also be extracted from seeds, skins, stems, lees and must deposits, taken individually or in combination.

The structure of polyphenols, also called phenolic compounds, includes a benzene nucleus with one or more hydroxyl groups, free or engaged with a substituent such as an alkyl, ester or sugar. The molecular weight of polyphenols can vary from less than 100 g/mol to more than 30,000 g/mol.

The polyphenols present in grape pomace belong to various groups: simple phenolic derivatives, flavonoids (flavonols and anthocyanins) and condensed, more complex phenolic structures.

A conventional method for recovering polyphenols from grape pomace is based on solid/liquid extraction by solvent followed by purification and drying. "Solid/liquid extraction" refers to the selective dissolution of one or more solutes of a solid matrix in liquid solvent. It is one of the oldest unit operations. This operation consists in contacting the liquid solvent with the solid matrix. In the case of the extraction of polyphenols, this contact is carried out by total immersion of the solid matrix in the liquid solvent or by spraying/washing the solid matrix with solvent.

According to the solvent used, the membranes of the cells of the seeds, skins or stems are more or less weakened, which facilitates the release of polyphenols from the cells.

Much work has been done concerning the influence of the operational parameters of solid/liquid extraction of polyphenols. The principal parameters are solvent type, temperature, contact time, liquid/solid ratio, particle size and pH.

Regarding solvents, methanol, ethanol, ethyl acetate and water are used most often in extractions from skins and from grape pomace in general. Among these, methanol seems to be the solvent that provides the best extraction rate, followed by ethanol and then water (Pinelo et al., 2005). Indeed, polyphenols are solubilized more easily in methanol than in the other two solvents. However, ethanol and water are preferable when extracting polyphenols for an application in foods.

With regard to the liquid/solid ratio, it seems that the higher the liquid/solid ratio, the better the extraction of polyphenols. However, from an economic point of view, this variable must be optimized in order to reduce the method's costs, notably by reducing the consumption of liquid solvent.

At the conclusion of the solid/liquid extraction, the obtained extracts contain a large number of other compounds such as sugars, proteins, amino acids, mineral salts, etc. As a result, purification is carried out in order to remove them. Several purification techniques exist. The principal techniques used are adsorption-desorption and filtration.

Following this purification, the purified extracts are dried in order to obtain a polyphenol powder. In powder form, the product is stabilized.

Numerous intensification techniques have also been developed, such as ultrasound and pulsed power. These intensification techniques act on the membranes and/or walls of cells constituting the solid plant matrix in order to facilitate the extraction of biocompounds such as polyphenols.

Two main pulsed-power intensification techniques exist. They use electrical pulses to concentrate, in very short time periods, electrical energy stored in a condenser. This electrical energy is then injected into a treatment chamber containing the solid plant matrix, for example grape pomace. This sudden injection of electrical energy into the chamber makes it possible to destabilize the physical, biological and/or chemical properties of the cells of the solid plant matrix, which can have highly advantageous characteristics for the extraction of biocompounds such as polyphenols.

A first pulsed-power technique uses a pulsed electric field (PEF technique, or simply PEF hereinafter). The pulsed electric field induces pores on the membrane of a plant or animal cell: this is the phenomenon of electroporation.

The pulsed electric field can also act on the intracellular contents of the cell (e.g., to detach the cell membrane from the cell wall as well as to disrupt its intracellular contents).

The creation of a pulsed electric field requires a high-voltage generator and a treatment chamber including at least two electrodes, one being connected to the generator and the other being connected to ground.

The plant matrix is placed in the treatment chamber. The high-voltage generator then transforms the alternating electric current into pulsating direct current. The energy of each pulse is temporarily stored in one or more condensers and then discharged by the electrodes in the treatment chamber.

The ability to extract compounds of interest from plant cells with PEF depends on several operational parameters, which fall in two categories: parameters related to the method (amplitude of the electric field applied, duration and number of pulses, temperature) and parameters related to the plant matrix (conductivity).

The second pulsed-power technique uses high-voltage electrical discharges (HVED technique, or simply HVED hereinafter). This technique was first intended for military and scientific applications requiring very high energies.

The creation of high-voltage electrical discharges requires a treatment chamber and an electric generator designed for high currents (thyristors, IGBT, GTO, etc.) or high voltages (line and Tesla transformers, Marx generators, etc.).

The treatment chamber includes electrodes, whose most commonly used combinations are tip-planar and tip-tip. The electrodes are entirely or partially submerged in water.

The plant matrix is placed in the treatment chamber and submerged. The electric generator stores electrical energy in a set of storage condensers or inductors. The presence of high voltage at the terminals of the electrodes causes a phenomenon of electrical breakdown and the creation of an electric discharge between the two electrodes. When an electric discharge is applied in water, as it is here, it produces shock waves which come into contact with the plant matrix. The latter then fragments according to the number of pulses injected, thus releasing biocompounds, including polyphenols.

This state of the art made it possible to highlight certain shortcomings of traditional solid/liquid extraction methods and led toward research into intensification of the extraction. First, the traditional solid/liquid extraction method is relatively long (between 3 hours and 20 hours). A high temperature (above 50° C.) is also required, resulting in a sizeable energy cost.

Moreover, the addition of organic solvents or sulfites has an environmental cost and limits applications of the final product. Finally, in a general manner, for the extraction of alcohol, tartaric acid or possibly polyphenols, there is no method the parameters of which are rationalized and optimized.

Consequently, it appears necessary to improve the extraction method by an intensification method.

Presentation

The invention thus aims at overcoming these disadvantages of the prior art, in order to increase the effectiveness of the extraction of molecules of grape pomace or compounds thereof, while providing a treatment of lower energy costs and while reducing the addition of chemicals.

In a particular application, the invention aims at providing a method for extracting polyphenols having a better extraction yield than conventional methods, while maintaining, even improving, the oxidizing activity of the extracted polyphenols thanks to the method.

To that end, the invention provides a method for extracting molecules of interest from a plant matrix made up of all or part of grape pomace, the method comprising the following steps:
  electrical treatment of the plant matrix by pulsed power;
  diffusion of the molecules of interest of the treated plant matrix in a hydroalcoholic solvent or a solvent composed of ethyl acetate; and
  recovery of the molecules of interest having diffused.

Certain preferred but nonrestrictive aspects of the method are as follows:
  the molecules of interest are polyphenols;
  the solvent is hydroalcoholic and includes between 25% and 50% alcohol;
  the alcohol is ethanol;
  the solvent includes a mixture of alcohol and ethyl acetate;
  the mixture includes between 5% and 30% ethyl acetate;
  the solvent further includes water;
  the diffusion temperature is between 40° C. and 70° C.;
  the duration of the diffusion step is at least 10 minutes;
  the electrical treatment and diffusion steps are carried out with a continuous flow of solvent in a treatment tube;
  the electrical treatment is applied via coaxial electrodes, the distance between the electrodes being about the radius of the treatment tube;
  the electrical treatment is applied via electrodes spaced apart by about 5 mm;
  the electrical treatment is carried out by the application of high-voltage electrical discharges;
  the total specific energy of the treatment of the high-voltage discharges is between 70 and 90 kJ·kg$^{-1}$, preferably 80 kJ·kg$^{-1}$;
  the solvent-grape pomace ratio used during the diffusion step is between 4 and 6, preferably 5;
  the diffusion temperature is 60° C.;
  the electrical treatment is carried out by the application of pulsed electric fields;
  the intensity of the pulsed electric field is between 15 and 25 kV·cm$^{-1}$, preferably 20 kV·cm$^{-1}$;
  the diffusion temperature is 50° C.;
  it further includes a step of purification and/or a step of pulverization of the molecules obtained following the recovery step; and
  the plant matrix includes at least one element chosen from the group consisting of: grape pomace and constituents thereof, lees, must deposits, tea, cocoa beans, berries, and oilseeds.

According to a second aspect, the invention provides polyphenols likely to be obtained by the implementation of a method in accordance with the invention.

According to a final aspect, the invention provides the use of these polyphenols to improve the gustatory properties of wine.

DETAILED DESCRIPTION

We will now describe a method for extracting molecules in accordance with the invention from grape pomace, illustrated by the extraction of polyphenols.

This method can be implemented on each solid element constituting pomace, namely seeds, skins and stems, on lees or on must deposits, or a combination thereof. Grape pomace, seeds, skins, stems, lees, must deposits and combinations thereof are referred to as "plant matrix" hereinafter.

The raw material used for the extraction can result directly from wine making, or can have been preserved beforehand for a predetermined period (generally up to a year or more, as needed) by deep freezing or by adding an antioxidant (such as sulfur dioxide). Indeed, it should be noted that grape pomace is produced only once a year during the harvest, after pressing, and it breaks down rapidly. Its use throughout the year thus requires the ability to store it between two grape harvests.

Grape pomace can thus notably be preserved in hermetic and opaque plastic bags, to protect it from photo-oxidation, either at about 4° C., preferably in the presence of 0.01% sulfur dioxide, or at −31° C., after deep freezing.

The polyphenols are then extracted in three principal steps:
(1) electrical treatment of the raw material for the purpose of damaging cell membranes or walls in order to facilitate extraction;
(2) solid-liquid diffusion during which the molecules migrate from the grape pomace toward a hydroalcoholic solvent; and
(3) recovery of the diffused molecules.

The purpose of the electrical treatment is to intensify the extraction of polyphenols during the subsequent step of solid-liquid diffusion of polyphenols from the grape pomace into a solvent. It can notably be selected from treatment with high-voltage electrical discharges (HVED) or treatment with pulsed electric fields (PEF).

The order of steps (1) and (2) is not restrictive. Indeed, the solid-liquid diffusion can begin before the electrical treatment.

As a variant, the electrical treatment can begin during the diffusion, after a first extraction in a hydroalcoholic solvent or water. Indeed, the objective of this first extraction is to modify the electrical conductivity of the solvent by enrichment in ionic compounds stemming from pomace in order to improve the application of the electric field.

The plant matrix can further undergo a pressing intended to remove part of its water of constitution in order to promote the application of the electrical treatment and to limit the volumes of materials and solvents used.

Polyphenols include simple phenolic derivatives and flavonoids.

Simple phenolic derivatives are derivatives of hydroxybenzoic acid (gallic acid), hydroxycinnamic acid (caffeic acid, coumaric acid, ferulic acid, stilbenes) or lignins.

Hydroxycinnamic acid derivatives include caffeic acid, coumaric acid, ferulic acid and stilbenes (trans-resveratrol, cis-resveratrol, glucosides of trans- or cis-resveratrol, trans-piceids, cis-piceids, etc.).

Flavonoids include anthocyanins, flavanols and flavonols.

The principal anthocyanins are glucosylated derivatives of cyanidin, peonidin, petunidin, delphinidin and malvidin.

Flavanols include, among others, catechin, epicatechin gallate, epicatechin, procyanidins, in particular procyanidins $B_1$ and $B_2$, and polymers thereof: poly(catechin), poly(epicatechin), poly(gallocatechin), poly(epigallocatechin), or heteropolymers.

Polyphenols can be used in wine making methods to improve the gustatory properties of wine.

Flavonols include, among others, kaempferol and glycosides thereof, quercetin and glycosides thereof, and isorhamnetin glycosides.

In the present application, the term "polyphenol" refers either to a single particular compound cited above, or to a mixture of at least two compounds cited above.

Treatment with HVED

HVED treatments intensify the extraction of polyphenols by mechanically breaking down the structure of the raw material of pomace. More precisely, treatment with HVED uses pressure waves, cavitation processes and turbulence phenomena, all of which cause the material to fragment, thus promoting the transfer of compounds from the cell's interior to its exterior.

"High voltage" refers to voltages sufficient to produce electrical discharges, advantageously greater than 20 kV, for example 50 kV, for tip-planar electrodes spaced apart by 5 mm.

Treatment with HVED can also be carried out on a laboratory scale (in a 1 liter treatment enclosure, for example), a semi-pilot scale (in a 35 liter treatment enclosure, for example), or an industrial scale using a continuous treatment cell within which the product to be treated circulates, such as, for example, a tube 1 meter in length and a few centimeters in diameter capable of treating several tons of plant matrix per hour, indeed up to 40 tons per hour (electrodes thus being placed along the path of circulation).

An example of a device for applying HVED includes notably a high-voltage generator connected to a treatment chamber.

The treatment chamber includes two electrodes between which grape pomace diluted in a solvent such as water or a hydroalcoholic mixture is introduced. The electrodes are made of stainless steel or aluminum, and include a tip electrode (typically 10 mm in diameter) connected to the generator and a planar electrode (typically 120 mm in diameter) connected to the mass. The distance between the electrodes is between 2 and 10 mm, and is preferably about 5 mm. Indeed, at this distance, the latency before electric breakdown is reduced, thus limiting energy losses.

It will be noted, however, that the optimal distance between electrodes varies with the shape of the electrodes, the voltage applied to the electrodes and the dimensions of the treatment chamber.

The high-voltage generator includes a condenser designed to store electrical energy and then to discharge it in the treatment cell via a spark gap in order to produce electric breakdown in the water and to generate an electric discharge.

The electrical treatment thus consists in applying a given number n of pulses (i.e., electrical discharges) to the solid and liquid mixture consisting of pomace and water.

The parameters acting on the effectiveness of the treatment are notably:
treatment temperature, selected between 40° C. and 70° C.;
duration t of the treatment (proportional to the number of pulses)

with $t = n \cdot x \cdot t_i$ wherein:
n is the number of pulses, and
$t_i$ is the duration of a pulse (s),
solvent/grape pomace ratio, also called liquid/solid ratio, preferentially selected to be 5;
distance between electrodes;
voltage applied;
energy supplied; and
pulse frequency.

These parameters indeed make it possible to optimize the permeabilization of the cell structure of pomace.

On a laboratory scale, the generator can, for example, supply a maximum voltage of 40 kV for a maximum current of 10 kA and generate pulses of a duration of about 10 μs at a frequency of about 0.5 Hz. The average energy of an electrical pulse supplied by the generator is thus 160 J per pulse.

On a semi-pilot scale, the generator can, for example, supply a maximum power of 40 kV for a maximum current of 30 kA and generate pulses of a duration of about 100 μs at a frequency of about 0.5 Hz. The characteristics of the electrical treatment (such as the average energy of an electrical pulse) are, however, more flexible than in the case of the laboratory generator. For example, at low energy the discharge of a 200 nF condenser can supply an average energy of 160 J per pulse, whereas at high energy the discharge of a 5 μF condenser can supply an average energy of 4,000 J per pulse.

The total specific energy of the treatment (in relation to the weight of treated grape pomace) with HVED is between 70 and 90 kJ/kg, preferably 80 kJ/kg.

On an industrial scale, the parameters are identical except for the distance between the electrodes, which can be greater. For example, when the electrodes are assembled coaxially (wherein a first electrode extends parallel to the axis of revolution of the treatment tube (typically along this axis), while the second electrode extends coaxially to the first electrode, so that the flow of the product passes between the two electrodes) in the treatment tube, the distance between electrodes being preferably about equal to the radius of the tube, for example 1.27 cm. On the other hand, when the electrodes are assembled collinearly (wherein the cathode and the anode are substantially aligned and alternate along the tube), the optimal distance for the batch configuration can be retained, which is thus about 5 mm between the cathode and the anode along the treatment tube.

Treatment with PEF

In the case of treatment with PEF, the extraction of polyphenols is principally intensified by electroporation of the cell membranes of the grape pomace. This treatment can be applied to relatively small quantities of plant matrix (about 1 to 10 g of plant matrix) or to greater quantities (about 100 to 500 g).

It is in particular possible to apply a treatment with PEF at low intensity (on a laboratory scale, with 0.1-1.3 kV/cm), or at high intensity (on a semi-pilot or industrial scale, with 0.5-20 kV/cm).

In the case of a low-intensity treatment, the experimental device consists of a low-volume (a few cm³) PEF treatment cell connected to a PEF generator.

The total PEF treatment time ($t_{PEF}$, s) is defined by the duration of the pulse ($t_i$, s) and the total number of pulses ($N_{tot}$). The latter depends on the number of trains (N) and the number of pulses per train (n).

All of the generator's treatment parameters can be controlled by control software. For example, the generator can supply a maximum power of 400 V for a maximum current of 40 A and can generate pulses of a duration between about 10 and 10,000 µs. The generator can thus supply between 1 and 1,000 pulse trains, each comprising 1 to 10,000 pulses with an idle period between each train of between 1 and 3,600 s.

Given that the intensity of the electric field (E, V/cm) is defined by the ratio of the voltage applied (U, V) and the distances between electrodes (d, cm), $$E = \frac{U}{d}$$

with this experimental device, for a distance between electrodes d of 3 mm, it is thus possible to reach a maximum intensity of about 1.3 kV/cm.

Generally, the intensity selected is greater than 0.5 kV/cm.

When a high-intensity treatment is used, and according to the nature of the plant matrix (pomace, seeds, etc.), the intensity of the electric field required can be rather high, such as, for example, for uncrushed grape seeds. At the most, for grape seeds, the intensity of the field is typically selected between 15 and 25 kV/cm, and preferably 20 kV/cm.

It is possible to use the same generator and the same treatment chamber as for the low-intensity treatment used to generate HVED on a laboratory scale, using, for example, two parallel, planar stainless steel electrodes in the place of tip and planar electrodes. The distance between the electrodes can also vary from 2 to 10 mm, i.e., a corresponding PEF intensity of 4 to 20 kV/cm.

The principal operational parameters that can act on the effectiveness of the treatment are as follows:
- extraction solvent (water alone, water/alcohol mixture, alcohol alone);
- treatment temperature, selected between 40° C. and 70° C., preferably 50° C.;
- treatment period (proportional to the number of pulses), and
- electric field intensity (defined by the distance between electrodes);
- pulse frequency;
- pulse shape; and
- pulse polarity (unipolar or bipolar).

Hydroalcoholic Diffusion

In order to optimize the extraction of molecules, preferentially polyphenols, the treated mixture undergoes the diffusion step in combination with electrical treatment with HVED or PEF. The diffusion step can begin before the electrical treatment and end after the electrical treatment, or can begin immediately after the electrical treatment.

During the diffusion, it is preferable not to exceed a temperature of 60° C. in order to limit the thermal degradation of the polyphenols.

Moreover, at a low temperature (20° C.) the diffusion can be rather long (up to 4 hours), whereas at a higher temperature (between 40° C. and 60° C.) the diffusion is between 1 hour and 1.5 hours. Typically, increasing the diffusion temperature from 20° C. to 60° C. makes it possible to increase the extracted polyphenols content of the solvent by 33% and antioxidant activity by 48% after 60 minutes of extraction.

On an industrial scale, the diffusion temperature can be between 50° C. and 60° C., for example.

The diffusion is carried out in a hydroalcoholic solvent or a solvent composed of ethyl acetate. If during the electrical treatment (with HVED or PEF) the grape pomace is submerged in a hydroalcoholic solvent or a solvent composed of ethyl acetate, this solvent can be the same as used for the electrical treatment and the diffusion.

The hydroalcoholic solvent is a mixture of water and alcohol with an alcohol content varying from 25% to 50% by weight. The water can be distilled water or tap water. The alcohol can be methanol or ethanol. Nevertheless, ethanol is preferable for a subsequent use of the extracted molecules in the field of foods.

If ethyl acetate is used, it can be used in a mixture with ethanol or methanol. The ethyl acetate/alcohol mixture includes between 5% and 30% ethyl acetate. It is also possible to use a ternary ethyl acetate/alcohol/water mixture, preferably a ternary ethyl acetate/ethanol/water mixture, in volume proportions notably between 4/1/4 and 10/1/10.

The alcohol or ethyl acetate is introduced into the water before, during or after the electrical pretreatments, but before the diffusion.

If the solvent is a hydroalcoholic solvent, the quantity of extracted polyphenols increases with the alcohol content, since ethanol, which is a polar solvent, promotes the extraction of polyphenols due to their greater solubility in this solvent than in water alone. In addition, it disrupts the external structure of cell membranes, thus enabling the extraction of polyphenols located within membranes or inside cells.

The quantity of solvent in relation to grape pomace is adjusted by respecting a liquid/solid weight ratio between 1 and 20, preferably between 4 and 10 in the case of diffusion carried out in a 1 hour batch. Indeed, the greater the ratio, the greater the quantity of extracted polyphenols. However, a plateau is reached from a liquid/solid ratio of about 5, the saturation of the solvent (water) occurring at lower ratios.

For example, following one or the other of the electrical pretreatments, diffusion in a solvent composed of 30% ethanol and 70% water makes it possible to obtain the best extraction yield, increasing it by a factor of 3 in comparison with a solvent composed only of water (2.8±0.4 g gallic acid equivalents (GAE) per 100 g of dry matter for treatment with HVED and 7.5±0.4 g GAE for treatment with PEF) and the best antioxidant activity of the extracts (66.8±3.1 g TEAC per kilogram of solid mass for treatment with HVED).

According to a preferred embodiment, during the diffusion step, the pomace pretreated electrically is placed in a solvent composed of 30% ethanol and 70% water with a liquid/solid ratio of about 5. After 1 hour of diffusion at 30° C. or 50° C., the solvent then includes polyphenols in dissolved form or in colloidal suspension.

The water used can be distilled water, purified water or simply tap water.

It will be noted, however, that the polyphenols migrate progressively from the pomace toward the solvent during the first 30 minutes of extraction, and then reach a plateau between 30 and 60 minutes during which the extraction kinetics slow considerably.

The pH of the solution is advantageously acidic. A pH below 6 makes it possible to limit degradation of the polyphenols. A pH of 4, which is the natural pH of grape pomace, makes it possible to protect anthocyanins. If need be, the pH can be modified by the addition of an acid, preferably a food acid.

After diffusion, the solvent containing the polyphenols in dissolved form or in colloidal suspension is separated from the grape pomace, for example by filtering.

The liquid polyphenol extracts are then separated from the solvent and other undesired extracts by centrifugation and then transformed into powder. This pulverization step makes it possible on the one hand to increase the stability of the polyphenols and, on the other hand, to provide a product in a marketable form.

Since the extracts can contain sugars and proteins, according to the subsequent application selected for the polyphenols (pharmaceutical, cosmetic and/or agri-food), it can further be necessary to purify them before drying, for example by solid-phase extraction. This purification technique is notably founded on the distribution of compounds between a solid phase (adsorbent) and a liquid phase (sample) in accordance with conventional techniques.

Scaling

Below, we will detail the operational parameters of the electrical treatment before being applied in order to intensify the extraction of polyphenols by electrical treatments on a semi-pilot scale. To that end, we will more particularly describe the case of treatment with HVED. Nevertheless, this is in no way restrictive and the person skilled in the art will be able to apply the teachings that follow to the case of treatment with PEF.

Treatment with HVED on a laboratory scale can be carried out in an enclosure containing 50 g of grape pomace and 250 g of water (for a total mass of plant matrix of 300 g), i.e., according to a liquid/solid ratio of 5. For the semi-pilot tests, by maintaining the liquid/solid ratio of 5, a total mass of plant matrix of 7,500 g is introduced into a second enclosure.

For scaling, the three important operational parameters of the electrical treatment are the electrical energy of a pulse (kJ/pulse), the energy of the electrical pulse per mass of treated plant matrix (kJ/kg/pulse) and the total specific energy of the treatment (kJ/kg).

The electrical energy of a pulse is limited by the condenser that composes the generator.

The energy of the electrical pulse per mass of treated plant matrix takes account of the quantity of raw material. For the laboratory tests of the preceding examples, the generator makes it possible to deliver an electrical pulse of 0.16 kJ. In the case of semi-pilot tests, it is possible to use, for example, two different condensers in a pilot generator in order to supply an electrical pulse of 0.16 kJ or 4 kJ. Once the pulse energy is set, it is then possible to determine the effect of the treatment period applied to the plant matrix by varying the number of pulses.

Finally, the total treatment energy takes into account both the number of pulses and the total quantity of plant matrix.

Following treatment with HVED, a discontinuous aqueous diffusion is carried out, for example with a 1 hour batch. On an industrial scale, up to 14 batches can be treated with a continuous flow of solvent in the treatment tube, which makes it possible to approach a continuous aqueous diffusion. The extraction yields obtained on a laboratory scale and a semi-pilot scale can thus be compared in terms of polyphenols extraction rate and oxidizing activity (whose measurement makes it possible to verify that the polyphenols extracted after HVED remain functional, notably in relation to their ability to trap oxidants).

When an electrical energy of a pulse of 0.16 kJ/pulse is applied, no improvement in polyphenols extraction in relation to simple diffusion is observed on the semi-pilot scale.

On the other hand, this is not the case when the energy per mass of treated plant matrix between the two scales is preserved. In the case of laboratory scale, the relationship between the energy supplied and the total mass of plant matrix is 0.53 kJ/kg/pulse.

When a treatment of total specific energy of 53 kJ/kg is applied (with 100 pulses of 0.53 kJ/kg/pulse, for example) on a laboratory scale and a semi-pilot scale, the extracted polyphenols content on a semi-pilot scale represents only 38% of that obtained on a laboratory scale. Nevertheless, retaining the energy per mass of treated plant matrix makes it possible to improve the extraction of polyphenols compared to simple diffusion (control). The same tendency is found concerning the antioxidant activity of the liquid extracts of polyphenols.

In addition, it is also preferable to take account of the geometry (dimensions and shape) of the treatment chambers when the scale of the tests is modified (notably when moving from laboratory scale to semi-pilot scale or industrial scale). Indeed, according to the shape of the treatment chamber, the electrical discharges are distributed differently within the treatment chamber on the same treated plant matrix insofar as they produce high-pressure shock waves (up to 1,000 MPa) which are responsible for turbulence and agitation of the liquid within the chamber.

Typically, if one looks at the height/diameter ratios of treatment chambers, dead zones within treatment chambers with a smaller height/diameter ratio can be larger, whereas agitation due to shock wave propagation can be reduced in treatment chambers with larger height/diameter ratios. It is, in fact, the pressure field within the treatment chamber, which results from the energy of the discharge per unit volume and the distance between the electric discharge and the walls of the chamber, which is a determining factor. Pressure levels greater than 100 bars are required to significantly increase the extraction of polyphenols.

Consequently, the energy required for HVED to have an effect on extraction yields depends on the geometry of the treatment chamber, and a minimal energy function of the configuration of the treatment chamber is necessary. Below that minimum, electrical discharges seem to have only little effect on the extraction of polyphenols.

It is also preferable to vary the total treatment energy by adjusting the number of pulses sent on the plant matrix (pomace, seeds, lees, etc.). Indeed, the larger the total specific energy, the better the polyphenols extraction yield. More precisely, antioxidant activity and extraction yield increase linearly with number of pulses discharged in the plant matrix. However, an optimal extraction exists: the polyphenols yield increases and then decreases beyond a certain treatment energy value. For laboratory tests, the optimal total specific energy is 100-160 kJ/kg. For semi-pilot tests, it is 400-550 kJ/kg. A greater treatment energy is thus necessary on a semi-pilot scale in order to obtain results equivalent to those obtained on a laboratory scale.

Typically, excellent results are obtained with 1,000 pulses, a treatment of 533 kJ/kg total energy: the polyphenols concentration is thus 7 times greater in relation to a control test without electrical treatment, whereas the antioxidant activity of the extracts is increased by a factor of 5, and the extraction rates ($\approx$200 mg GAE/l) obtained on a semi-pilot scale with 160 kJ/kg are thus similar to those determined on a laboratory scale with 53 kJ/kg by preserving specific energy (kJ/kg) and by varying energy per pulse (J).

In addition, according to the type of plant matrix, the energy necessary is more or less high. For example, the stems, the branched ligneous part, seem to be the most resistant to discharges because the maximum polyphenols contents are obtained with the highest energy values (400 kJ/kg on a semi-pilot scale, 213 kJ/kg on a laboratory scale). On the contrary, skins seem to be more sensitive; an energy of 133 kJ/kg is sufficient on a semi-pilot scale to extract about 400 mg GAE/l. A similar quantity of polyphenols is obtained on a laboratory scale after a treatment of 53 kJ/kg.

Consequently, even if the tendencies are similar, extraction on a semi-pilot scale requires a total treatment energy that is, overall, greater than that applied on a laboratory scale. The treatment conditions thus do not seem equivalent in the treatment chambers. The pressure field generated by the electric discharge is different in the two treatment systems. The physical characterization of the electric discharge thus makes it possible to study the role of the pressure field on cell breakdown and consequently on the extraction of polyphenols.

Results

We will now compare the general performance of the extraction method in accordance with the present invention with the conventional methods which do not include a preliminary step of intensification of the extraction and/or use a diffusion solvent containing only water or only alcohol.

It is first reminded that pretreatments with HVED and PEF act differently on the treated plant matrix, require different operational parameters (generally according to the type of plant matrix, namely pomace, seeds, etc.) and in the end produce different yields. Adaptation of the parameters to the type of treated plant matrix (pomace, seeds, etc.) is, however, left to the abilities of the person skilled in the art and will not be systematically detailed further in this description.

First, we will detail the performance in the case of the implementation of a treatment with HVED. Nevertheless, comparable performance was also obtained during the implementation of the treatment with PEF.

Here, an electrical pretreatment with HVED during which 80 pulses of a total effective duration (i.e., the cumulative duration during which the solution was subjected to a discharge, without counting the pauses between two pulses or diffusion time) of 0.8 ms followed by a discontinuous diffusion per batch (with a batch of a duration of 1 hour) was applied to grape pomace.

After 1 hour of extraction at 20° C., the yields in total solutes are about 70% with electrical pretreatment with HVED, compared with 22±2% in the absence of HVED (but with diffusion in a hydroalcoholic solvent). It should be noted in addition that after only 1 hour of extraction with HVED, the polyphenols content is 30% greater than that obtained after 4 hours of diffusion without HVED.

The extraction of polyphenols is also improved by increasing the temperature to 60° C. The increase in temperature makes it possible to increase the fluidity of the plasma membrane and to promote the creation of pores. Thus, the performance of HVED diffusion at 20° C. is similar to that of simple diffusion at 40° C. without HVED. The same tendency is observed for HVED diffusion at 40° C. and simple diffusion at 60° C.

The effect of the electrical pretreatment, whether with HVED or PEF, is thus to reduce the duration and temperature of the diffusion step (and thus energy cost) while improving the extraction performance of the diffusion step.

On a laboratory scale, to treat grape skins with PEF, an electric field intensity of 1,300 V/cm applied to the skins for an effective treatment period of 1 second makes it possible to obtain a maximum cell membrane permeabilization rate. For a treatment with HVED, the application of 60 pulses (of an effective duration of 0.6 ms) is sufficient to reach a total solutes extraction plateau.

Thus, the number of pulses necessary to fragment cells of skins is fewer because the skins are a more fragile plant matrix than whole pomaces.

On a semi-pilot scale, the effective treatment time must, on the other hand, be increased to obtain the same results. On an industrial scale, the reaction time is, on the other hand, close to that of a semi-pilot scale, or about 1 ms.

Pretreatments of the skins with PEF or HVED also have a positive effect on the extraction of polyphenols and total solutes. Indeed, the quantity of polyphenols extracted is significantly greater immediately after HVED (increase by a factor of 4 in relation to simple diffusion) and then reaches an extraction plateau, whereas after PEF the extraction of polyphenols is increased by a factor of 2.

In addition, the initial extraction rates are different in the case of conventional diffusion (without intensification pretreatment) and in the case of PEF- and HVED-assisted diffusions. The final quantities of polyphenols in the solvent, however, remain equivalent after about 3 hours of extraction (the final values for the assisted diffusions being slightly greater, however).

The principal compounds of the polyphenols obtained, identifiable for example by high-performance liquid chromatography (HPLC), are flavanols (catechin and epicatechin) and flavonols (quercetin-3-O-glucoside and kaempferol-3-O-glucoside). HVED-assisted diffusion produces an extraction of catechin and epicatechin that is more effective than that from simple diffusion or PEF assisted-diffusion. This difference can be attributed to tissue fragmentation caused with HVED, as PEF does not break down plant cells.

The diffusion temperature can also have an impact on the performance of extractions from skins. Indeed, the damage caused to the cells (and thus the extraction of polyphenols) induced by the electrical treatments are all the more pronounced as temperature increases.

The highest polyphenols content is obtained for HVED-assisted diffusion at 60° C. (C=32 µmol GAE/g DM), whereas HVED-assisted extraction at 20° C. is as effective as simple diffusion (without pretreatment) at 40° C.

There is an optimal total specific energy for the extraction of polyphenols with an electrical treatment with HVED of 80-100 kJ/kg with the application of 160 J pulses for 10 microseconds. The total polyphenols extraction rate is thus 1.37±0.11 g GAE per 100 g of dry matter with a corresponding antioxidant activity of 23.02±3.06 g Trolox equivalent antioxidant capacity (TEAC) per kilogram of dry matter. The same tendency was observed for individual phenolic compounds (catechin, epicatechin, quercetin-3-O-glucoside and kaempferol-3-O-glucoside). Beyond this energy dissipated in the plant matrix, the formation of free radicals and ozone during HVED contributes to the degradation of the extracted polyphenols.

On a semi-pilot scale, this optimal total specific energy is about 400 kJ/kg.

In the case of electrical treatment with PEF, optimal extraction occurs when an electric field intensity of 20 kV/cm is applied to the pomace (or to any other component, such as seeds, etc.) for 6 ms (i.e., a treatment of 318 kJ/kg), followed by diffusion at a treatment temperature of 50° C. in an extraction solvent containing 30% ethanol and 70% water. The maximum total polyphenols extraction rate is thus 9 g GAE per 100 g of dry matter and is reached after about 19 minutes. In comparison, in the case of treatment with HVED (carried out for 1 ms at 40 kV in the same solvent), the same polyphenols content is reached after a diffusion time of 14 minutes.

In all cases, the electrical pretreatment combined with the use of a hydroalcoholic extraction solvent thus makes it possible to reduce the duration of the diffusion step.

The implementation of PEF has the advantage over the implementation of HVED of preserving the structure of the solid plant matrix: PEF acts by the electroporation of cell membranes without fragmentation of the plant matrix, while HVED damages membranes and cell walls of the plant matrix (the shock waves and cavitation bubbles produced during the treatment collide with the plant matrix and fragment it more or less according to the intensity of the treatment).

It is also important to note that the combination of ethanol in the extraction solvent with electrical pretreatment with PEF further improves the electroporation of the cell membranes. Indeed, ethanol weakens the cell membranes, thus improving the PEF treatment which then forms membrane pores that themselves improve the penetration of ethanol into the membranes and thus the extraction of polyphenols.

If the plant matrix consists of seeds, the diameters of the PEF-treated seeds are similar to those of untreated seeds (about 4,000 μm), and of fine particles (dust located on the seed surface) of about 10-20 μm in the suspension after simple diffusion and PEF-assisted diffusion. In comparison, treatment with HVED reduces seed size by a factor of 20 (up to about 200 μm in diameter).

In addition, solid-liquid separation by centrifugation is faster for suspensions treated with PEF than those treated with HVED, so that the presence of seed debris makes such a separation longer in the case of HVED pretreatment.

In particular for treatment with HVED, the application of HVED on grape pomaces makes it possible to:

(1) increase by up to 3.5 times the yields in total solutes, i.e., all the compounds having passed from the skins to the solvent, and up to 2.5 times the level of polyphenols;

(2) reduce the diffusion temperature (yields in solutes after extraction at 40° C. without HVED being the same as after extraction at 20° C. with HVED);

(3) reduce the duration of the diffusion (after an effective HVED time of 0.8 ms, the yield in solutes is 50% whereas it is only 25% after 60 minutes of extraction without HVED).

Pretreatment with electrical discharges improves the extraction of polyphenols, on both a laboratory scale and a semi-pilot scale (which then makes it possible to envisage a possible application of HVED on an industrial scale).

Preservation Method

Concerning the method for preserving pomace, the addition of sulfur dioxide has no visible influence on the extraction of total solutes during diffusion with or without HVED. On the contrary, when the pomaces are frozen and then unfrozen, the final yield in solutes increases from 27±2% (fresh pomace) to 68±4% (frozen pomace) for simple diffusion. With HVED pretreatment, the extraction yield reaches a maximum of 88±4% after four hours of diffusion for frozen pomaces. With regard to polyphenols, these two preservation methods influence their extraction with a maximum rate of 0.69±0.07% after four hours of extraction with HVED from frozen pomaces.

Thus, as a method of preservation, the addition of sulfur dioxide is preferable because the results of the extraction of solutes and polyphenols are closest to those obtained with fresh pomaces. In order to increase extraction yields, freezing is very effective and acts by affecting the structure of cells through the formation of ice crystals. In addition, freezing and treatment with HVED seem to act on different cellular levels, explaining the synergy observed between these two treatments. However, generally, electrical pretreatments (such as PEF) are effective only on intact plant cells, and thus require fresh plant material.

The method described above is not limited to the extraction of polyphenols. It can also be used to extract other molecules of interest such as polysaccharides, sugars, proteins, peptides, organic acids (malic acid, tartaric acid, etc.), amino acids, fatty acids, lipids, aromatic compounds, berry defense compounds, etc.

The method is not limited to the extraction of molecules of interest from grape pomace, as was seen above, but can also be applied to lees, must deposits, tea, cocoa beans, berries, oilseeds such as flax, apple, having undergone processing (pressing, fermentation, etc.) or not.

Furthermore, the polyphenols obtained by a method in accordance with the invention are powerful antioxidants (in particular flavonols and anthocyanins).

The content in percentages of dry matter obtained from the extracted polyphenols is thus greater than 60 for catechin, greater than 30 for epicatechin, less than 5 for quercetin-3-O-glucoside, and less than 1 for kaempferol-3-O-glucoside.

EXAMPLE 1

Electrical Treatment with HVED

The grape pomace used in this example is residue of pressed, unfermented *Vitis vinifera* var. *Pinot* Meunier grapes. The grape pomace is composed of seeds, stems and skins. The dry matter content of the grape pomace is 22.0±0.1% by weight.

The 1 liter treatment chamber used includes two stainless steel electrodes, one a tip 10 mm in diameter and the other a plate 35 mm in diameter, the two separated by 5 mm.

Treatment with HVED was applied to the grape pomace with the following parameters:
total specific energy: 80 kJ/kg;
solvent/grape pomace ratio: 5;
temperature: 20° C.;
total diffusion time: 60 min.

The diffusion step is also carried out at a temperature of 20° C. with stirring at 160 rpm.

The extraction yields results for the grape pomace are summarized in the following table:

| (g GAE/100 g dry matter) | 0% ethanol | 10% ethanol | 20% ethanol | 30% ethanol |
|---|---|---|---|---|
| Without HVED | 0.15 | Not determined | 0.2 | 0.3 |
| With HVED | 1.3 | 1.8 | 2.2 | 2.8 |

The antioxidant activities results for the grape pomace are summarized in the following table:

| (g TEAC/kg dry matter) | 0% ethanol | 10% ethanol | 20% ethanol | 30% ethanol |
|---|---|---|---|---|
| Without HVED | 2 | 4 | 3 | 3.5 |
| With HVED | 25 | 35 | 40 | 68 |

EXAMPLE 2

Electrical Treatment with PEF

Grape seeds were obtained beforehand from industrial grape pomace resulting from the pressing of *Vitis vinifera* var.

Pinot Meunier grapes. These grape seeds were separated from the grape pomace, dried industrially by treatment with hot air for a period of 15 to 20 min and then recovered. The average diameter of the grape seeds is 4 mm. The dry matter content of the seeds is 93±1%.

The 1 liter treatment chamber used includes two planar electrodes with a 95 cm surface area mounted in parallel and separated by 5 mm. For the PEF treatment, 50.0 g of grape seeds was placed between the two electrodes. The treatment chamber is then filled with solvent composed of 30% ethanol and 70% distilled water by weight.

The PEF treatment was applied to the plant matrix with the following parameters:
electric field intensity: 20 kV/cm;
duration: 6 ms;
temperature: 50° C.

The diffusion step is carried out at a temperature of 50° C. in the same solvent.

The results of the extraction yields are summarized in the following table:

| (g GAE/100 g dry matter) | 30% ethanol |
| --- | --- |
| Without PEF | 5.5 |
| With PEF | 7.5 |

EXAMPLE 3

Profile of Polyphenols with an Electrical Treatment with HVED

| Polyphenol | Minimum concentration in a solution obtained after diffusion (clarified supernatant) |
| --- | --- |
| Gallic acid | 3 mg/l |
| Tryptophan | 15 mg/l |
| Catechin | 100 mg/l |
| Epicatechin | 70 mg/l |
| Quercetin-3-O-glucoside + glucuronide | 25 mg/l |
| Kaempferol-3-O-glucoside | 5 mg/l |
| Peonidin-3-O-glucoside | 20 mg/l |
| Malvidin-3-O-glucoside | 100 mg/l |
| Flavanols | 500 mg/l |

EXAMPLE 4

Profile of Polyphenols with an Electrical Treatment with PEF

| Polyphenol | Minimum concentration in a solution obtained after diffusion (clarified supernatant) |
| --- | --- |
| Gallic acid | 0.5 mg/l |
| Tryptophan | 2 mg/l |
| Catechin | 6.5 mg/l |
| Epicatechin | 5.5 mg/l |
| Malvidin-3-O-glucoside | 20 mg/l |
| Flavanols | 80 mg/l |

The invention claimed is:

1. A method comprising:
   electrical treatment by pulsed power of the plant matrix made up of all or part of grape pomace;
   diffusing molecules of interest of the treated plant matrix in a solvent comprising a mixture of alcohol and ethyl acetate; and
   recovering the molecules of interest having diffused.

2. The extraction method of claim 1, wherein the molecules of interest are polyphenols.

3. The method of claim 1, wherein the solvent is hydroalcoholic and comprises between 25% and 50% of alcohol.

4. The method of claim 3, wherein the alcohol is ethanol.

5. The method of claim 1, wherein the mixture comprises between 5% and 30% of ethyl acetate.

6. The method of claim 1, wherein the solvent further comprises water.

7. The method of claim 1, wherein the diffusion temperature is between 40° C. and 70° C.

8. The method of claim 1, wherein the duration of the diffusion step is at least 10 minutes.

9. The method of claim 1, wherein the electrical treatment and diffusion steps are carried out with a continuous flow of solvent in a treatment tube.

10. The method of claim 9, wherein the electrical treatment is applied via coaxial electrodes, wherein the distance between the electrodes is about the radius of the treatment tube.

11. The method of claim 1, wherein the electrical treatment is applied via electrodes spaced apart by about 5 mm.

12. The method of claim 1, wherein the diffusion temperature is 60° C.

13. The method of claim 1, further comprising a step of purification and/or a step of pulverization of the molecules obtained following the recovery step.

14. The method of claim 1, wherein the plant matrix further comprises at least one element chosen from the group consisting of lees, must deposits, tea, cocoa beans, berries, and oilseeds.

15. A method comprising
   electrical treatment by pulsed power of the plant matrix made up of all or part of grape pomace;
   diffusing polyphenols of the treated plant matrix in a solvent comprising a mixture of alcohol and ethyl acetate;
   recovering the polyphenols having diffused; and
   mixing the polyphenols with wine.

16. A method comprising:
   electrical treatment by pulsed power of the plant matrix made up of all or part of grape pomace;
   diffusing molecules of interest of the treated plant matrix in a solvent comprising a mixture of alcohol and ethyl acetate; and
   recovering the molecules of interest having diffused, wherein the electrical treatment is carried out by the application of high-voltage electrical discharges.

17. The method of claim 16, wherein the mixture comprises between 5% and 30% of ethyl acetate.

18. The method of claim 16, wherein the solvent further comprises water.

19. A method comprising:
   electrical treatment by pulsed power of the plant matrix made up of all or part of grape pomace;
   diffusing molecules of interest of the treated plant matrix in a solvent comprising a mixture of alcohol and ethyl acetate; and recovering the molecules of interest having diffused, wherein the electrical treatment is carried out by the application of pulsed electric fields and the intensity of the pulsed electric field is between 15 and 25 kV.cm$^{-1}$.

20. The method of claim 19 wherein the mixture comprises between 5% and 30% of ethyl acetate.

21. The method of claim 19, wherein the solvent further comprises water.

22. A method comprising:

electrical treatment by pulsed power of the plant matrix made up of all or part of grape pomace;

diffusing molecules of interest of the treated plant matrix in a hydroalcoholic solvent or a solvent composed of ethyl acetate, wherein the solvent includes a mixture of alcohol and mixture of alcohol and ethyl acetate; and recovering the molecules of interest having diffused, wherein the electrical treatment is carried out by the application of pulsed electric fields and the intensity of the pulsed electric field is between 15 and 25 kV.cm$^{-1}$, and wherein the electrical treatment and diffusion steps are carried out with a continuous flow of solvent in a treatment tube.

23. The method of claim 22, wherein the electrical treatment is applied via coaxial electrodes, the distance between the electrodes being about the radius of the treatment tube.

* * * * *